Dec. 19, 1939.    F. HART    2,184,077
DECALCOMANIA TRANSFER
Filed June 20, 1938
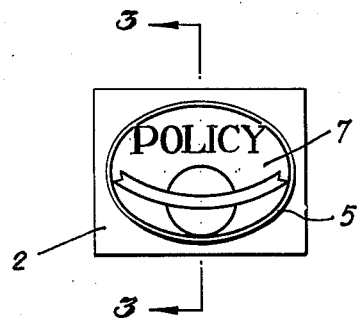
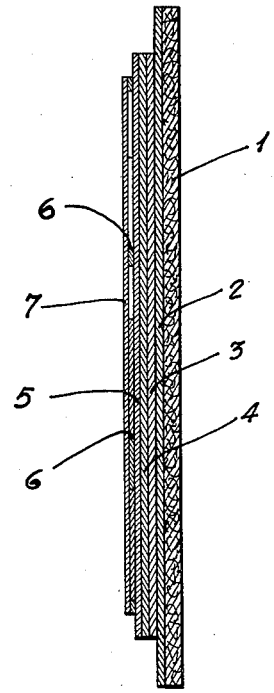
FRANK HART,
INVENTOR;
BY
ATTORNEY.

Patented Dec. 19, 1939

2,184,077

UNITED STATES PATENT OFFICE 2,184,077

DECALCOMANIA TRANSFER

Frank Hart, Los Angeles, Calif.

Application June 20, 1938, Serial No. 214,629

10 Claims. (Cl. 41—33)

This invention relates to transfers, and particularly to that type known as a decalcomania.

The invention has for an object the provision of a decalcomania transfer which is readily adapted to be placed upon the skins of fruit, such as, for instance, oranges, grapefruit, bananas, peaches, and the like, and which transfer when so placed will adhere firmly to the skin.

Another object is the provision of a transfer which may be easily and rapidly placed upon the skin of fruits, which will adhere to said skin without checking, rolling or any likelihood of becoming loosened, to the end that the said transfer becomes, for practical purposes, a part of the skin, whereby the transfer will not be injured even though the fruit is roughly handled.

Another object is the provision of a decalcomania transfer which may be placed rapidly upon the skin of fruit, and which does not require expert workmen for this purpose.

The transfer of the present invention is very tenacious, thin, not subject to cracking, does not peel, and which retains its ability to function without hardening over a long period of time. It is a well known fact that the average transfer dries out so that the same becomes practically useless after it has aged a few months. The present transfer is not subject to this difficulty.

It has become customary for different grower associations, and others, to apply some mark indicating a given brand to different fruits, and to do this, oftentimes the surface of the skin is seared with a hot iron so as to imprint the desired mark. However, such marks are not ornamental and impair the surface of the fruit, and may, in certain instances, cause decay. The present transfer is ornamental in appearance, capable of application at a more rapid rate than by imprinting, and will not endanger or damage the skin of the fruit.

Another object of the present invention is the provision of a transfer which is economical to purchase, as the transfer can be made quite cheaply.

With the above mentioned objects and others in view, the invention consists in the novel and useful provision, formation, construction, association, and relative arrangement of parts, members and features, all as disclosed in a certain embodiment in the accompanying drawing, described generally, and more particularly pointed out in the claims.

In the drawing:

Figure 1 illustrates a decalcomania transfer upon a decalcomania backing.

Figure 2 shows the transfer removed from the decalcomania backing or sheet, and, Figure 3 is a sectional view on the line 3—3 of Figure 1.

Referring to Figure 3, it will be seen that I have shown in cross section several layers of materials placed upon the decalcomania paper, here indicated as 1. This paper is obtainable upon the market and the same is usually processed and when so processed, is called decalcomania or transfer paper. This paper comprises the paper backing 1 having on the surface thereof a water soluble gum 2. This water soluble gum is usually composed of a layer of gelatin which lies against the surface of the paper, plus a layer of gum tragacanth. Gum tragacanth is, of course, starchy and while the moisture, such as water, may penetrate the paper 1, the gelatin as a rule, while wetted, will remain upon the paper, the starchy substance permitting the removal of the transfer carried by the paper.

Naturally this layer 2 is quite thin. Over the layer 2, I apply in any suitable manner, either by screening or spraying, a water insoluble adhesive layer or film 3. This water insoluble adhesive layer is preferably of the type that has characteristics such as to permit it to readily adhere to a surface, such as the skin of fruit. I have found that a resinous material is satisfactory for this purpose. I particularly have found that a resinous material having a base resin of 65% and a modifying acid of 35% and an acid number of 18 to 24 is satisfactory. Particularly, a resin having a chemical combination of phthalic and other polybasic acids, glycerine, and other polyhydric alcohols and modifying agents, such as saturated fatty acids, or I may use a plasticized resin. Such a resin is quite tough and durable and while I may utilize other types of resin, such as damar or ester gum, still I prefer a resin of the composition set forth, although any resin which has the characteristics desired, to-wit: a water insoluble adhesive, may be used. It is necessary that the resin used be of the non-oxidizing type, to the end that the same may remain in its original tacky condition. The presence, of course, in a resin of the type desired of non-drying oils or fatty acids is essential, as it adds to the durability, toughness, and most of all, its non-cracking characteristics.

The water insoluble adhesive just described, may be aptly termed "normally tacky" or as being characterized by a "normally permanent tackiness". By "normally tacky" or "normally permanent tackiness" I mean a tacky condition which continues for a substantial length of time under normal atmospheric conditions, either when protected by the paper base or after the base is removed and the adhesive is exposed to the atmosphere. For instance, when protected by the paper base and the water soluble adhesive the insoluble adhesive will retain its tackiness throughout the normal life of the transfer and after the base is removed it will also retain its tackiness for at least several days. But as the transfer is designed to be applied to an object within a comparatively short time after the base is removed, it is only necessary that the tacky condition remain a sufficient length of time to suit any use to which it may be put.

One tacky surface of this water insoluble layer is adjacent the surface of the water soluble gum shown at 2. The opposite tacky surface of the water insoluble layer 3 has applied thereto a sealer of some character to overcome the tackiness. This sealer layer, designated as 4, may be of any material, such as a gum that will dry over a resin; for instance, shellac. I have provided what I term a body carrier 5 upon which printing 6 may appear. The body carrier or coat plus the sealer coat, to wit, 5 and 4, may form a single coat. However, in the drawing, I have shown for the purpose of clarity, two separate coatings. The body carrier or coat is a flexible non-tacky foundation lacquer film. This particular film may be formed of linseed oil and varnish gum plus a white pigment, such as titanium dioxide. The printing shown by the layer 6, which is over the flexible non-tacky foundation 5, may be made by a screen process, or printing, or lithographing. Insofar as its application to the water insoluble adhesive coating is concerned, the printing 6, together with either the sealer coat 4 or carrier 5, or both, may be defined as a composite transfer.

In the showing of Figures 1 and 2, the word "Policy" may be in black lines with shaded blue; the circle may be in black and the band crossing the circle in red. Also, words may be imprinted in the circle, as well as upon the band, as desired. In the screen process, it is customary to use a screen which has blanked off the letters and through the medium of a squeegee, the printing material is forced through the screen to form the letters and other indications. As many colors as desired may thus be imprinted by using many screens, the sequence of steps to perform such operations being well known in the art.

After the decalcomania as an entirety, including the lettering or other drawing, has been placed upon the non-tacky foundation 5, there may be a further coat placed over the printing comprising ethyl cellulose to provide a hard smooth surface, and to likewise permit various sheets of the decalcomania transfers to be packed together without the different sheets adhering. This last layer or coat placed over the coat 6, to wit, the ethyl cellulose, is indicated at 7.

The operation, uses and advantages of the invention just described are as follows:

When small transfers are imprinted, such as shown in Figures 1 and 2, the operator first wets the transfer paper. As the paper is somewhat similar to blotting paper in the absorption of water, the starchy content of the layer 2 goes into solution and permits the water insoluble adhesive layer 3 to slide from the paper 1. Obviously, all the remaining layers will move with the layer 3. Thus, all that an operator need do is to dip the decalcomania in water and then rapidly, through use of the thumb, move the transfer onto the surface of the fruit. The water insoluble layer will immediately adhere to the surface of the fruit in a tenacious manner. Tests have shown that it is impossible to remove the transfer without destroying the entire transfer after it is once placed on the fruit. The water insoluble adhesive layer permits the decalcomania transfer to immediately adhere to a surface upon which it is applied. Most decalcomania transbers are first wetted, applied to a surface, and then must dry before they will adhere. No drying is necessary with the present transfer, as it will stick while wet as well as when dry. Furthermore, this transfer will adhere to waxy, porous or uneven surfaces. The average decalcomania transfer will not adhere to any of these types of surfaces.

While I have particularly mentioned the application of the transfer to fruit, nevertheless such a transfer is readily applied to other articles, if desired; for instance, glass, wood, and the like.

It has been found that the average operator may place as high as one thousand transfers on fruit in an hour's time, thus showing that the transfer is easy to use, very efficient, and practical for the purpose intended.

I claim:

1. A decalcomania transfer comprising a decalcomania paper carrying a water soluble film on a surface thereof, a water insoluble adhesive film upon said water soluble film, a sealer film on the surface of said water insoluble film opposite the water soluble film, said sealer film adapted to have applied thereon a transfer design, and whereby when the decalcomania transfer is wetted, the water soluble film is released from the water insoluble adhesive film for application of said adhesive film to an object.

2. A decalcomania transfer comprising a base having on one surface thereof a water soluble gum, a non-oxidizable water insoluble adhesive film having an adhesive surface applied to said water soluble gum, a sealer gum applied over the adhesive film, a flexible non-tacky foundation lacquer film applied over said sealer gum, and a transfer design imprinted upon said lacquer film.

3. The method of forming a decalcomania transfer, which consists in first providing a decalcomania paper, a surface of which is provided with a water soluble gum, applying over said gum a water insoluble adhesive film, sealing one surface of said water insoluble adhesive film, then printing a transfer design over said seal.

4. The method of forming a decalcomania transfer which consists in applying upon a base having a water soluble film on the surface thereof a coating of water insoluble adhesive film, applying to the exposed surface of said adhesive film a sealer and body coat to overcome the adhesive properties of the said surface, and thereafter imprinting a transfer design upon said sealer and body coat.

5. The method of forming a decalcomania transfer, which consists in providing decalcomania paper, a surface of which is provided with a water soluble gum, applying a water insoluble adhesive film over said water soluble gum, applying a sealer film over said water insoluble adhesive film, followed by treating the sealer film with a flexible non-tacky foundation lacquer film, and thereafter imprinting upon said last film the transfer design.

6. A decalcomania transfer comprising a base having a water soluble gum thereon, a water insoluble film having tacky and non-tacky surfaces, the tacky surface applied over said gum, and a transfer design on said non-tacky surface.

7. A decalcomania transfer comprising a paper base upon which is placed a film of water soluble gum, a film of normally tacky, water insoluble material applied over said water soluble gum, and a film of non-tacky water insoluble material applied over said last mentioned film, whereby when the transfer is wetted, the soluble gum permits the water insoluble film to be removed from said base for application to an object.

8. A decalcomania transfer comprising a paper base upon which is placed a film of water soluble gum, a film of water insoluble adhesive applied over said water soluble gum, said adhesive being characterized by normally permanent tackiness, and a film of non-tacky water insoluble material, adapted to receive a printed design thereon, applied over said last mentioned film, whereby when the transfer is wetted, the soluble gum permits the water insoluble film to be removed from said base for application to an object.

9. A decalcomania transfer comprising a paper base upon which is placed a film of water soluble gum, a film of normally tacky, water insoluble material applied over said water soluble gum, and a composite transfer design applied over said last mentioned film, whereby when the transfer is wetted the water soluble gum permits the water insoluble film to be removed from said base for application to an object.

10. A decalcomania transfer comprising a paper base upon which is placed a film of water soluble gum, a film of water insoluble adhesive applied over said water soluble gum, said adhesive being characterized by normally permanent tackiness, and a composite transfer design applied to said last mentioned film, whereby when the transfer is wetted, the water soluble gum permits the water insoluble film to be removed from said base for application to an object.

FRANK HART.